Jan. 26, 1954 F. J. BERGER 2,667,261
ROLLER CONVEYER
Filed Sept. 26, 1951 3 Sheets-Sheet 1
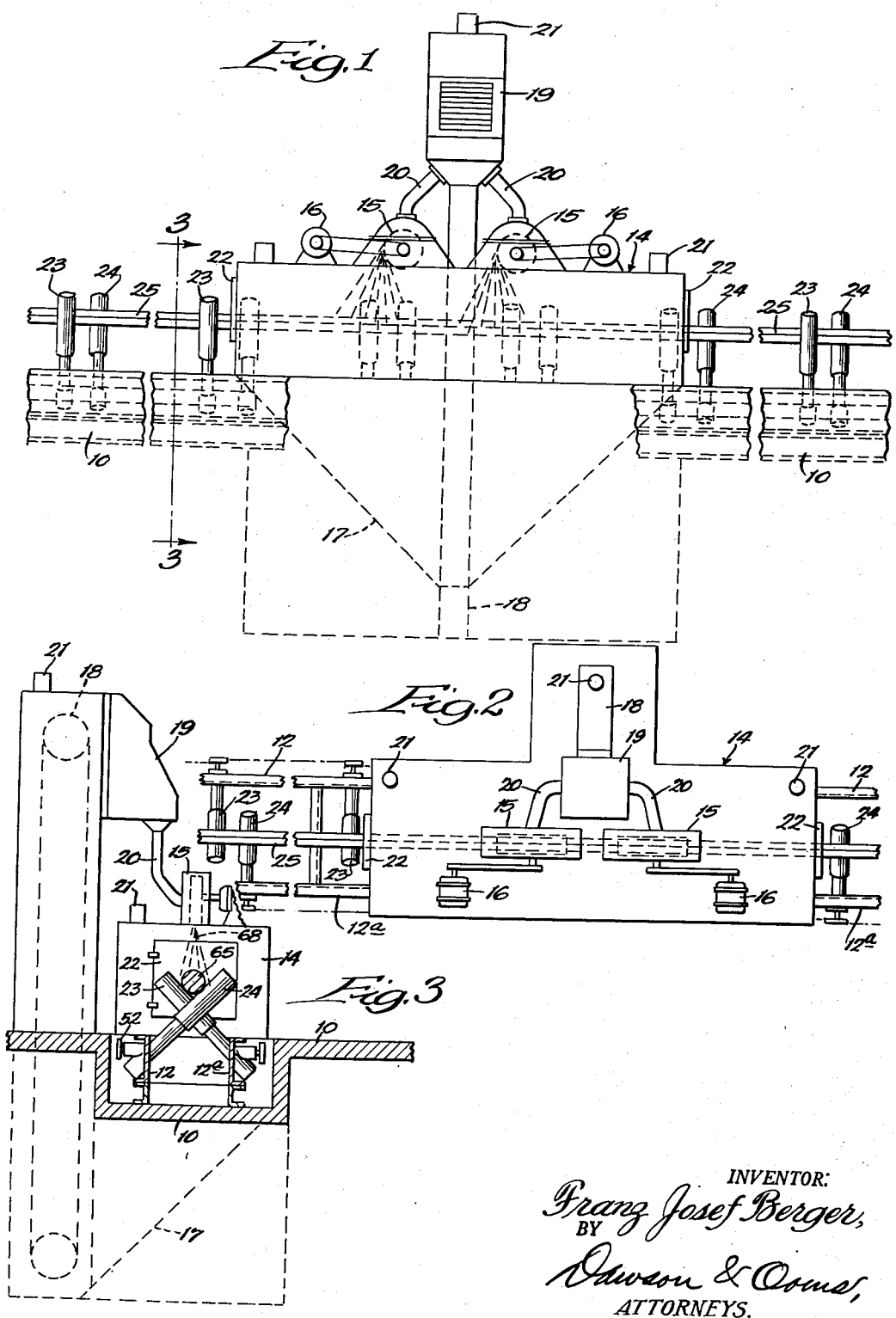
INVENTOR:
Franz Josef Berger,
BY
Dawson & Ooms,
ATTORNEYS.

Jan. 26, 1954  F. J. BERGER  2,667,261
ROLLER CONVEYER
Filed Sept. 26, 1951  3 Sheets-Sheet 2
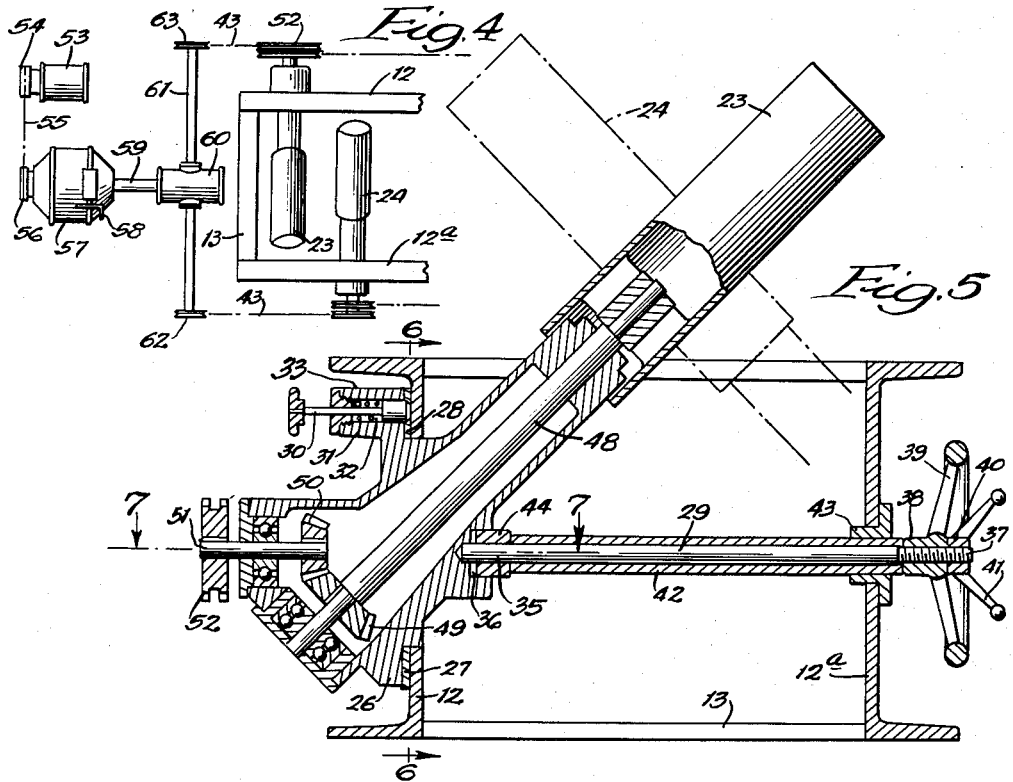
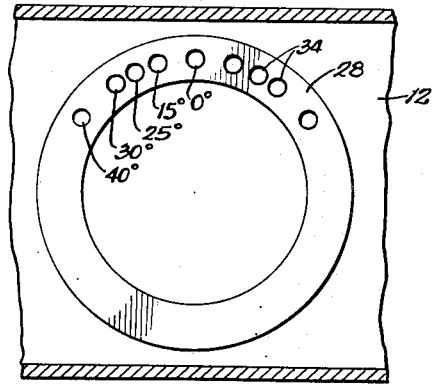
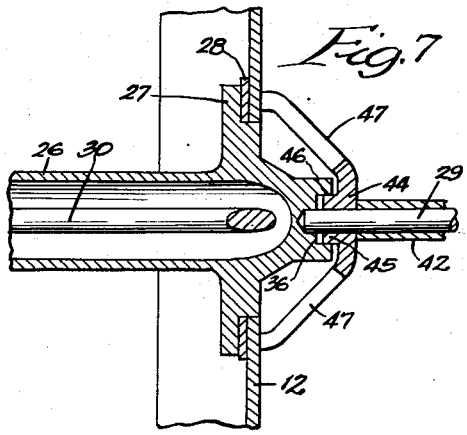
INVENTOR:
Franz Josef Berger,
BY
Dawson & Orms,
ATTORNEYS.

Jan. 26, 1954 F. J. BERGER 2,667,261
ROLLER CONVEYER
Filed Sept. 26, 1951 3 Sheets-Sheet 3
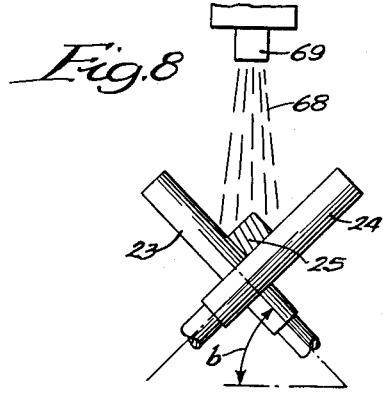
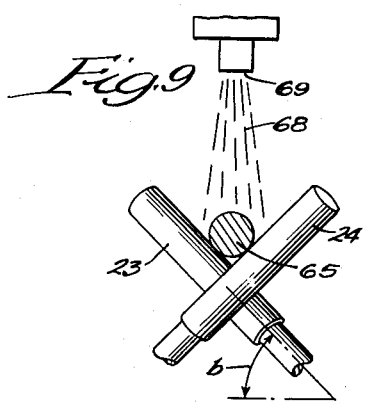
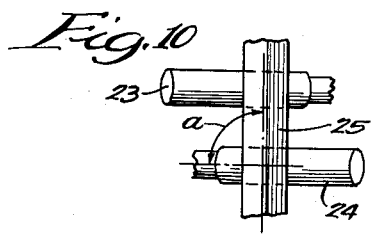
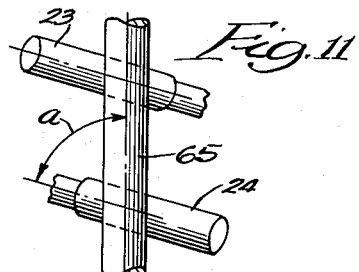
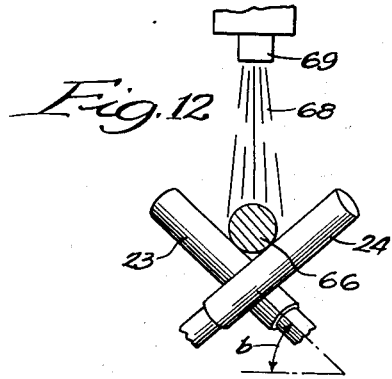
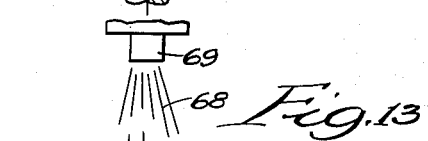
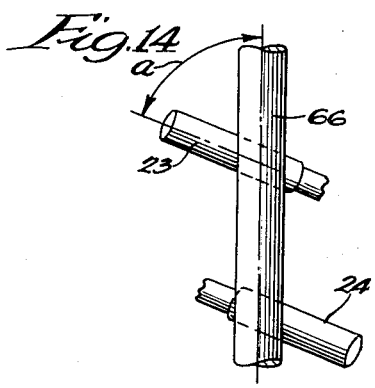
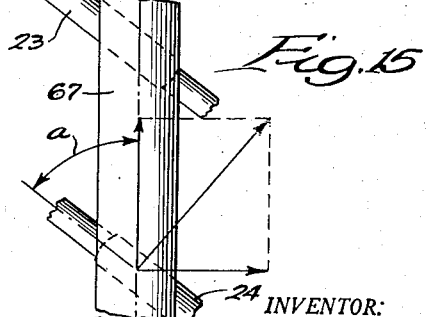
INVENTOR:
Franz Josef Berger,
BY
Dawson & Ooms,
ATTORNEYS.

Patented Jan. 26, 1954

2,667,261

UNITED STATES PATENT OFFICE 2,667,261

ROLLER CONVEYER

Franz Josef Berger, Neftenbach, Switzerland, assignor to American Wheelabrator & Equipment Corporation, Mishawaka, Ind., a corporation of Nebraska Application September 26, 1951, Serial No. 248,305

7 Claims. (Cl. 198—127)

This invention relates to a roller conveyor for use in the movement of an elongate member of bar, tubular or polygonal shape and it relates more particularly to a conveyor of the type described wherein the rollers are adjustable for use in the conveyance of members of varying dimension and contour and for simultaneously imparting longitudinal and axial movement thereto in varying ratios in the event that such combinations of movements are desired.

In the past, roller conveyors of the type described have been produced with a driven conveyor roller mounted at fixed angular relationship for coaction with one or more adjustable idler rollers. Such roller conveyors have been incapable of flexibility in use to impart the desired movement to work pieces of various dimensions. It is an object of this invention to produce a roller conveyor of the type described in which each conveyor unit comprises a pair of conveyor rollers having axes which cross each other but wherein each roller in a pair is rockable separately as about the contour of a cone for angular adjustment in conformance with size, shape and movement desired in the article being conveyed.

Another object of this invention is to produce a new and improved roller conveyor of the type described and it is a related object to produce a roller conveyor which is sturdy in construction, easy in operation, and capable of angular adjustment for most expedient use in achieving the purpose for which it is intended.

These and other objects and advantages of this invention will hereinafter appear and for purposes of illustration, but not of limitation, embodiments of the invention appear in the accompanying drawings in which—

Figure 1 is a diagrammatic side elevational view of a roller conveyor embodying features of this invention;

Figure 2 is a diagrammatic top plan view of the conveyor system shown in Figure 1;

Figure 3 is a sectional view taken along the line 3—3 of Figure 1;

Figure 4 is an enlarged top plan view illustrating the drive for the roller units of the conveyor shown in Figure 1;

Figure 5 is a side elevational view partially in section through a conveyor roller and its support;

Figure 6 is a sectional view taken substantially along the line 6—6 of Figure 5;

Figure 7 is a sectional view taken along the line 7—7 of Figure 5;

Figures 8, 9, 12 and 13 are diagrammatic illustrations in side elevation showing various positions of the conveyor rollers for imparting the desired results; and Figures 10, 11, 14 and 15 are diagrammatic top plan views of the rollers in their various positions shown in Figures 8, 9, 12 and 13, respectively.

As shown in the drawings, a foundation 10 supports a pair of elongate girders 12 and 12ª in the form of channel members, I beams, or the like, in spaced apart parallel relation and joined by cross-bracing members 13. The illustrated embodiment of the conveyor is shown for use in transporting elongate work pieces through a scouring house for removing scale or otherwise cleaning the surfaces thereof or the like. For this purpose, the girders 12 and 12ª are shown as leading through a scouring house 14 which is diagrammatically illustrated in Figures 1, 2 and 3 as being provided with two aligned centrifugal blasting wheels 15 mounted over the conveyor for operation by motors 16. It will be understood that the number and arrangement of wheels may vary from one to more than two in longitudinal alignment or in side by side spaced relation or the like.

The centrifugal wheels herein described are adapted to blast the surfaces of the work pieces as they are carried through the house with sand, grit, scouring or other abrasive substance and in order to make use of the abrasive again and again to economize production, a collecting bin 17 is provided beneath the conveyor portion located within the housing. The collector bin 17 comprises a V-shaped member having an opening in the lower end which leads to a bucket type conveyor or elevator 18 which carries the abrasive material upwardly for delivery into a storage tank 19 having pipes 20 which communicate with the centrifugal wheels for delivery of abrasive material thereto. In the event that it is desired to separate dust which might be generated by the scouring or blasting process, a dust collector and aerating system (not shown) may be provided between the collecting bin 17 and the storage tank 19 for communication with the bucket elevator 18 and the scouring house 14 through pipe connections 21. For the purpose of militating against passage of the abrasive material to the outside of the housing, doors 22 are provided at both ends of the scouring house for passage of work pieces therethrough into and out of the housing—the doors preferably being equipped with sealing members.

The roller conveyor comprises a number of pairs of rollers 23 and 24 arranged to cross each other at various angles to provide a suitable cradle in which work pieces 25 rest with the pairs of rollers being spaced apart and mounted at predetermined intervals along girders 12 and 12ª. Each conveyor roller 23 or 24 is mounted in a housing 26 having an annular flanged portion 27 operatively engaging a guide ring 28 for permitting rotatable movement of the housing about the axis of a tie rod 29, which extends crosswise of the direction of travel of the work piece, and relative the girder 12 upon which it is mounted. Each housing is provided with a retractable indexing pin 30 that is constantly urged by a coil spring 31 or other resilient member inwardly through an opening 32 that is provided in an outwardly extending cylindrical section 33 integral with the housing and into engagement with the guide ring 28. The guide ring is provided with a plurality of apertures 34 arranged therein for registry with the opening 32 through the housing and for receiving the retractable pin and index the housing relative to the girder. The apertures are marked, as shown in Figure 6, to indicate the angular relation of the opening as compared to a predetermined radial position.

The tie rod 29 extends crosswise between the spaced girders 12 and 12ª. One end portion 35 of the tie rod is fixed to the housing for rotational movement therewith by a pin 36 while the other end portion 37 of the tie rod extends outwardly through the opposite girder 12ª. The end portion 37 is threaded and is adapted to be threadedly engaged by a threaded hub 38 of a hand wheel 39 and a threaded lock nut 40 of a handle member 41. A tubular member 42, mounted concentrically on the tie rod 29, is adapted to be axially displaced relative to the tie rod upon loosening or tightening movement of the handle member 41 and the hand wheel 39. A bushing 43 having a bore with a bearing surface separates the tubular member 42 from the girder 12ª to which the bushing is fixed.

Axially slidable on the end portion 35 of the tie rod 29 and in abutting relation with the end of the tubular member 42 is a clamping yoke 44 having a hub 45 which slidably fits within a bore 46 of the housing 26 and two or more curvilinear yoke arms 47 which bear against the inner face of the girder 12 to effect a gripping relation therewith when the hand wheel and locking member are tightened upon the tie rod 29.

Supported within the housing for relative rotational movement along an inclined axis is an elongate driving shaft 48 keyed at one end to the roller 23 for rotational movement therewith. A bevel gear 49, fixed to the other end of the shaft 48, meshes with a second bevel gear 50 mounted on the end of a drive shaft 51 having an end portion which extends outwardly of the housing and mounts a sprocket wheel 52 through which a driving relation may be established.

As shown in Figure 4, the sprocket wheels 52, one of which is provided for each conveyor roller, are adapted to be driven from a central power source such as the motor 53 or other power means. The motor has a sprocket wheel or pulley 54 connected by a chain or belt 55 to a sprocket wheel or pulley 56 which drives a variable speed transmission 57 provided with a hand wheel 58 or other suitable means for adjusting the gear ratio for speed output. The output shaft 59 from the speed regulator operates through a gear train assembly 60 to impart turning movement to a drive shaft 61 having sprockets 62 and 63 fixed to the ends thereof. Sprockets 62 and 63 are each shown as being connected by separate chains 43 to the sprocket wheels 52 on the first pair of rollers 23 and 24. Additional driving chains or members may be used to connect the sprocket wheels of the first pair of rollers with the sprocket wheels of the second pair of rollers and so on to transmit driving movement from one to the other in the roller conveyor, or a single or any combination of sprocket chains may be used to impart driving movement to all or any combination of rollers. It will be apparent, however, that the speed of each roller will be substantially the same so as to impart uniform movement to the work piece being conveyed.

The operation of the roller conveyor will hereinafter be described in use for transporting an elongate work piece 25 of square or rectangular cross section, as illustrated in Figures 8 and 10. For this purpose, rollers 23 and 24 in each pair are adjusted to extend at an angle "a" of about 90 degrees with respect to the direction of travel of the work piece 25 and at an inclination of angle "b" to the horizontal of about 45 degrees or substantially at right angles to each other. When in these adjusted positions, the rectangularly shaped work piece will be conveyed linearly in the direction of the girders responsive to turning movement of the rollers.

In the event that the work piece to be conveyed is in the form of an elongate rod-like member 65 of small diameter, such as illustrated in Figures 9 and 11, or an elongate rod-like member 66 of larger diameter, as illustrated in Figures 12 and 14, or an elongate tubular member 67 of still larger cross section, as shown in Figures 13 and 15 and, in the event that it is desired to cause the work piece to rotate while it is being conveyed longitudinally by the rollers in order to expose its entire surface to the abrasive material 68 thrown thereon from the outlet 69 of the centrifugal wheels, then the individual rollers of each pair may be adjusted to greater or smaller "a" and "b" angles depending upon the diameter of the work and the ratio of rotational movement as compared to longitudinal movement, as shown in the drawings.

To effect such adjustment, lock handle 41 and hand wheel 39 are turned upon tie rod 29 to permit endwise displacement of the tubular member 42 in the outward direction whereby the hub 44 may be adjusted outwardly away from the housing to relieve the holding action of the yoke arms 47 against the grinder 12. Thereafter the indexing pin 30 may be withdrawn to disengage the end portion thereof from the indexing openings 34 in the guide ring 28 so as to permit the housing to be rotated manually or otherwise relative to the guide ring to the desired position of adjustment. After the indexing pin 30 is reinserted into a registered opening 34 of the guide ring 28 responsive to pressure applied manually coupled with the forces of the spring member 31 constantly urging the pin in the direction to seat within said opening, the hand wheel 39 is turned in the direction to displace the tubular member 42 inwardly and force the yoke arms 47 into gripping relation with the inner wall of the adjacent girder 12. This secures the housing against inadvertent turning movement and the hand wheel 39 is locked in tightened position by locking member 41. When properly adjusted, the roller can be driven by operation of the driving motor 53 and the speed of the roller may be adjusted by the speed regulator 57 responsive to turning movement of the control handle 58.

As illustrated in Figure 15, the ratio of linear speed of the work piece to axial speed may be regulated by adjustment of angle "a" of the rollers. Decrease in angle "a" increases the ratio of peripheral speed of the work piece relative to its axial speed while increase of angle "a" up to 45 degrees will increase the ratio of linear speed to axial speed. Theoretically, at an angle "a" of 45 degrees rotational movement of the rollers will function principally to impart linear movement to the work piece without peripheral turning movement.

It will be apparent from the description that turning movement of the housing 26 in the manner described imparts swinging movement of the axis about which the rollers 23 and 24 turn as though the axis were being swung about the periphery of a cone having its apex at the intersection between the axis of the tie rod 29 and the axis of the corresponding roller 23 or the like.

A roller conveyor embodying features of this invention makes it possible expediently to adjust the position of the conveyor rollers to impart the type of movement and speed of movement of the work piece in accordance with the type and size of work to be handled and the work to be performed thereon.

It will be understood that numerous changes may be made in the details of construction, arrangement and operation without departing from the spirit of the invention, especially as defined in the following claims.

I claim:

1. A roller conveyor comprising a plurality of aligned roller units in longitudinally spaced apart relation for conveying an elongate member in the longitudinal direction, each roller unit comprising a pair of conveyor rollers which cross each other intermediate their ends to form a cradle therebetween, means for adjusting each conveyor roller independently as about the surface of a cone to vary its angular relationship both in the vertical and horizontal direction, and means for securing the conveyor roller in the adjusted position and driving means for rotating each of the rollers about its axis.

2. A roller conveyor comprising a plurality of roller units arranged in longitudinally spaced apart relation for conveying an elongate member in the longitudinal direction, each roller unit comprising a pair of conveyor rollers rotatable about axes which are askew, said rollers crossing each other intermediate their ends to form a cradle therebetween, means for adjusting each conveyor roller independently as about the surface of a cone to vary its angular relationship both in the vertical and horizontal direction, means for securing the conveyor roller in the adjusted position, and driving means for imparting rotation to the conveyor rollers when in the adjusted position.

3. A roller conveyor comprising a plurality of roller units arranged in longitudinally spaced relation for conveying an elongate work piece in the longitudinal direction while also imparting rotational movement thereto, each roller unit comprising a pair of conveyor rollers rotatable about axes which are askew, means for adjusting the angular relationship of each conveyor roller independently of the other to various angles with the horizontal and vertical and with the horizontal angle being less than 90 degrees depending upon the ratio of longitudinal and rotational movement of the work piece desired, means for locking the roller conveyor against angular adjustment from the adjusted position, and driving means for imparting rotational movement to the conveyor rollers.

4. A roller conveyor comprising a plurality of roller units arranged in longitudinally spaced relation for conveying an elongate work piece in the longitudinal direction while also imparting rotational movement thereto, each roller unit comprising a pair of conveyor rollers angularly positioned to cross each other intermediate their ends to form a cradle therebetween, means for adjusting the angular relationship of each conveyor roller independently of the other to various angles with the horizontal and vertical and with the horizontal angle being less than 90 degrees depending upon the ratio of longitudinal and rotational movement of the work piece desired, means for locking the roller conveyor against angular adjustment from the adjusted position, driving means for imparting rotational movement to the conveyor rollerrs, and a speed control for varying the rotational movement of the conveyor rollers consistent with the speed of travel of the work piece desired.

5. A roller conveyor comprising a plurality of aligned roller units for conveying an elongate work piece in the longitudinal direction, each roller unit comprising a pair of supports in spaced parallel relation, a housing mounted on each support for rotational movement relative thereto about a horizontal axis, a conveyor roller mounted in each support for rotational movement about an axis which forms an acute angle with respect to the axis of the housing with the conveyor rollers of each pair crossing each other to provide a cradle for the work piece, means for adjusting the housing about its axis to rock the conveyor rollers as about the surface of a cone for adjusting its vertical and horizontal angular relation, means for releasably locking the housing in the adjusted position, and means for imparting rotational movement to each of the conveyor rollers.

6. A roller conveyor comprising a plurality of aligned roller units for conveying an elongate work piece in the longitudinal direction, each roller unit comprising a pair of supports in spaced parallel relation, a housing mounted on each support for rotational movement relative thereto about a horizontal axis, a conveyor roller mounted in each support for rotational movement about an axis which forms an acute angle with respect to the axis of the housing with the conveyor rollers of each pair crossing each other to provide a cradle for the work piece, means for adjusting the housing about its axis to rock the conveyor rollers as about the surface of a cone for adjusting its vertical and horizontal angular relation, means for releasably locking the housing in the adjusted position, means for imparting rotational movement to each of the conveyor rollers, and means for locating the position of the housing relative to normal.

7. A conveyor roller as claimed in claim 5 in which the means for releasably locking the housing against movement from the adjusted position comprises a tie rod rotatable with the housing along its axis, a yoke member slidable longitudinally along the housing and adapted to engage the support in gripping relation, and means for controlling movement of the yoke upon the tie rod for respectively tightening and relieving the gripping relation of the yoke with the support.

FRANZ JOSEF BERGER.

References Cited in the file of this patent

UNITED STATES PATENTS

| Number | Name | Date |
|---|---|---|
| 1,568,958 | Carter | Jan. 12, 1926 |
| 1,795,137 | Nye | Mar. 3, 1931 |
| 2,248,657 | Blondon | July 8, 1941 |
| 2,583,764 | Buckholdt | Jan. 29, 1952 |
| 2,592,236 | Bloom | Apr. 8, 1952 |